United States Patent
Wrba et al.

(10) Patent No.: US 6,670,575 B1
(45) Date of Patent: Dec. 30, 2003

(54) METHOD AND APPARATUS FOR REMOVING SUBSTANCE FROM THE SURFACE OF A WORKPIECE

(75) Inventors: Peter Wrba, Unterthingau (DE); Peter Hildebrand, Nesselwang (DE); Michael Kuhl, Füssen (DE); Martin Reisacher, Kempten (DE)

(73) Assignee: Lasertec GmbH, Pfronten (DE)

( * ) Notice: Subject to any disclaimer, the term of this patent is extended or adjusted under 35 U.S.C. 154(b) by 0 days.

(21) Appl. No.: 09/806,353

(22) PCT Filed: Sep. 30, 1998

(86) PCT No.: PCT/EP98/06217

§ 371 (c)(1),
(2), (4) Date: May 18, 2001

(87) PCT Pub. No.: WO00/18535

PCT Pub. Date: Apr. 6, 2000

(51) Int. Cl.[7] .............................. B23K 26/02
(52) U.S. Cl. ..................... 219/121.68; 219/121.82; 219/121.79
(58) Field of Search ................. 219/121.82, 121.8, 219/121.69, 121.79, 121.68

(56) References Cited

U.S. PATENT DOCUMENTS

| | | | |
|---|---|---|---|
| 4,154,530 A | * | 5/1979 | Connolly et al. ...... 219/121.61 |
| 4,914,270 A | | 4/1990 | Copley et al. |
| 5,095,190 A | * | 3/1992 | Aketagawa et al. ... 219/121.74 |
| 5,140,128 A | * | 8/1992 | Jones et al. ............ 219/121.72 |
| 5,231,264 A | * | 7/1993 | Fujita .................... 219/121.78 |
| 5,239,160 A | * | 8/1993 | Sakura et al. .......... 219/121.82 |
| 5,690,846 A | * | 11/1997 | Okada et al. .......... 219/121.71 |
| 6,172,330 B1 | * | 1/2001 | Yamamoto et al. ...... 219/121.7 |

FOREIGN PATENT DOCUMENTS

DE 42 09 933 A1 9/1993

* cited by examiner

Primary Examiner—M. Alexandra Elve
Assistant Examiner—Len Tran
(74) Attorney, Agent, or Firm—Wood, Herron & Evans, LLP

(57) ABSTRACT

A method of removing substance from the surface of a workpiece in which the removal of substance is effected layer-wise by irradiating a working site on the workpiece surface with a laser beam from a working head, the layer-wise removal of substance being carried out with the aid of a laser guidance guiding the laser across the surface of the workpiece within a working area predetermined by the apparatus, comprises positioning steps in which, after the start of the substance removal, the relative position of the workpiece and the working head are changed in accordance with a first and/or second criterion and adjusted so that a boundary of the working area comes to be disposed on different sections of the workpiece surface for identical working sites.

8 Claims, 4 Drawing Sheets

1

METHOD AND APPARATUS FOR REMOVING SUBSTANCE FROM THE SURFACE OF A WORKPIECE

The invention relates to a method and an apparatus for removing substance from the surface of a workpiece according to the preambles of the independent claims. A method for surface machining is known from the DE 42 09 933.

A manufacturing method suitable for complex shapes is the removal of substance from the full in accordance with the desired shape. In this case either the generated cavity may be the finally desired end product (for example in the case of a mould) or the remaining substance can correspond to a part to be produced. One type of substance removal particularly for fine structures is the one carried out by means of a laser beam.

FIG. 1 schematically shows a corresponding apparatus. A column 16 is provided with a fixed or shiftable workpiece table 14 on which a workpiece 11 is disposed. A laser head 13 emitting a laser beam 12 for generating a cavity or hollow 10 in the workpiece 11 is also fixed to the column 16. The substance removal is respectively effected from the currently accessible face/surface of the workpiece. The comparably highly energetic laser beam irradiates the currently accessible workpiece surface and leads to a vaporisation or melting of the workpiece substance there. The removal of substance is generally carried out layer-wise. The laser beam is guided across the workpiece surface in a scanning manner by a laser beam guidance, for example so that it scans the workpiece surface in a meandering way and removes a layer by melting and vaporisation in accordance with the desired limits or boundaries at that occasion.

In FIG. 1, the x- and z-coordinates are schematically indicated. The y-coordinate protrudes downwards through the plane of the drawing. The layers to be removed are respectively positioned substantially in the x-y-plane on different positions on the z-axis.

For constructional reasons the working area of the apparatus is generally limited. For example, the laser beam can not be guided or offset unlimitedly far. This is schematically shown in the lower part of FIG. 1. The numeral 13 indicates the laser light source. The numerals 12a and 12b respectively denote the farthest possible offsets of the laser beam in the x-direction (for example by means of mirrors). It may then maximally scan an area Bx in the x-direction. Corresponding considerations also apply to the y-direction. The apparatus thus has a work area B which is generally rectangularly limited and has the dimensions of Bx in the x-direction and of By in the y-direction.

When substance is to be removed in an area of the workpiece 11 which is larger than the work area Bx, By, it is principally possible to change a relative position of the workpiece 11 and the laser head 13 in a working area after the removal of one layer. Thereby the position of the working area on the workpiece is suitably shifted so that now another area on the workpiece can be worked.

This is schematically shown in FIG. 2 is a plan view and a cross sectional view of a cavity 10 to be produced. A flat bowl in which four poles are to remain will be taken as an example. The negative shape resembles a large button. The numerals 21 to 24 denote four positions for the working area of the apparatus. They are selected so that they are directly adjacent to each other and cover the desired area when combined. Each of the working areas has the dimensions Bx and By. This results in a first criterion necessitating a change of the relative position of the workpiece 11 with respect to the laser head 13. It corresponds to the necessity of a shift of the working area relative to the workpiece so that a workpiece surface can be worked which is too large to be completely covered by the working area of the apparatus.

Another criterion for changing the relative position is explained with reference to the cross sectional view of FIG. 2. The numeral 20 denotes the contour of the cavity shown in a plan view above. However, if a smaller cavity is presumed, as, for example, indicated by the broken line 20', such a workpiece section would be well covered by the work area Bx, By of the apparatus. Nevertheless problems may arise due to the fact that certain sections may be shadowed for the laser light. In the cross sectional view of FIG. 2 this is the case in the sections 26a when the light source is assumed to be disposed centrally above the cavity. Other sections 26b may possibly receive the laser light under so glancing an intersection that defined removal ratios can no longer be set. Therefore it may be desirable to change the relative position even in the case of "small" cavities to avoid shadowing and/or to obtain appropriate impinging or incidence angles of the laser light on the walls of the cavity. Returning to the lower part of FIG. 1 again, this may be otherwise expressed in that the change of the relative position is desirable because certain working positions of the workpiece are desirable in certain partial areas of the working area Bx, By. For example, the left walls of the poles and the angles formed with them on the bottom of the cavity can be accessed comparably well with the right section of the cone shown in the lower part of FIG. 1 while the right walls of the poles to be formed and the angles formed with them on the bottom of the cavity can be advantageously reached with the left section of the cone shown in the lower part of FIG. 1.

The two criteria may, for example, become necessary in combination with each other in the production of the cavity shown in FIG. 2 which is, on the one hand, larger than the working area and, on the other, has inaccessible areas and relatively vertical walls.

When now in the layer-wise removal the relative positions are shifted according to the requirements of the above mentioned criteria, problems may arise due to the fact that certain working sites of the workpiece are always disposed in the same section of the working area of the apparatus. It may now be generally assumed that the working properties and particularly the accuracy are not homogenous for the complete working area Bx, By. Particularly the edge sections are critical in this case as discontinuities of some kind will occur here, be it because the laser beam is switched on or off or because the movement is stopped, for example in the x-direction, and a movement in the y-direction is started. These discontinuities result in production inaccuracies which may disadvantageously add up during the layer-wise creation of the cavity.

It is the object of the invention to provide a method and an apparatus for removing substance from a surface of a workpiece in which manufacturing inaccuracies due to non-uniform removing properties in the working area can be avoided.

Said object is solved by the features of the independent claims. The dependent claims are directed to preferred embodiments of the invention.

According to the invention the relative positioning of the workpiece and the working head is, in addition to one or both the above mentioned criteria, set so that the limits of the working areas come to be positioned on different sections of the workpiece surface for identical working sites (with respect to the x- and y-coordinates).

According to the invention it is taken care that in a lower layer the boundaries of the working area are arranged differently on the workpiece than in previous layer. Possible discontinuities within the working area can not be prevented in this way. However, the discontinuities will not add up but will, on the one hand, be averaged out due to a shift of the boundaries and may, on the other hand, be restrained by control techniques.

It is to be explicitly noted here that at a date very close to the date of filing the present application the applicant filed two other applications relating to methods and apparatuses for laser machining of a workpiece, i.e. the application nos. . . . ("Tiefenmessung u.a." (Depth Measurement and Others)) and . . . ("Trennmittel" (Separating means)). Reference is herewith taken to the full content of said applications.

BRIEF DESCRIPTION OF THE DRAWINGS

Individual embodiments of the invention will now be described with reference to the drawings in which.

DETAILED DESCRIPTION OF THE DRAWINGS

Figure 1:
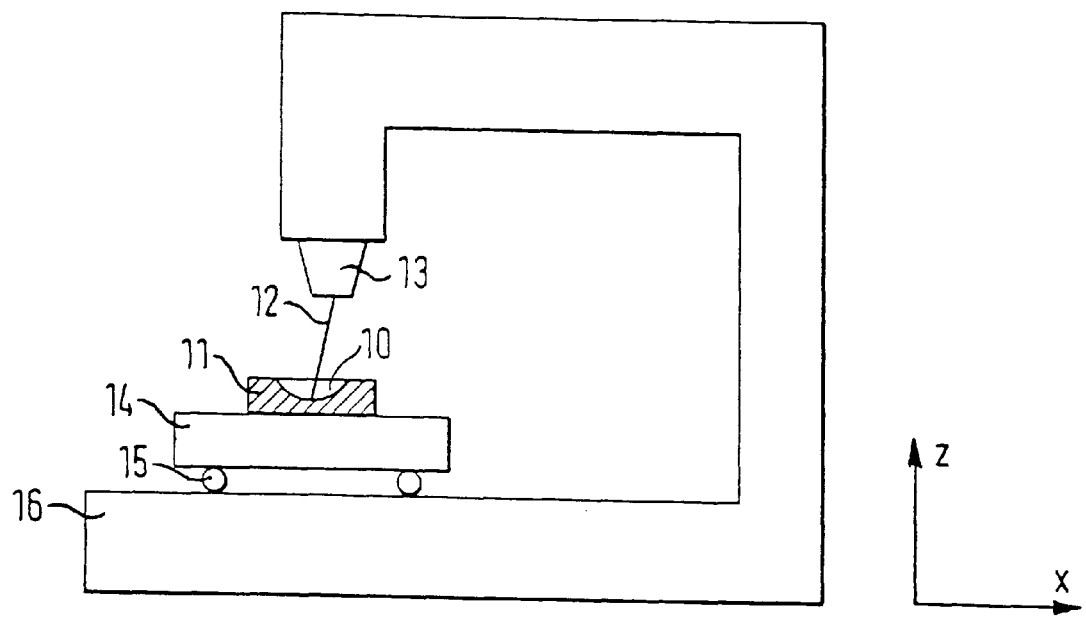
FIG. 1 shows a device to which the invention can be applied.
Figure 1:
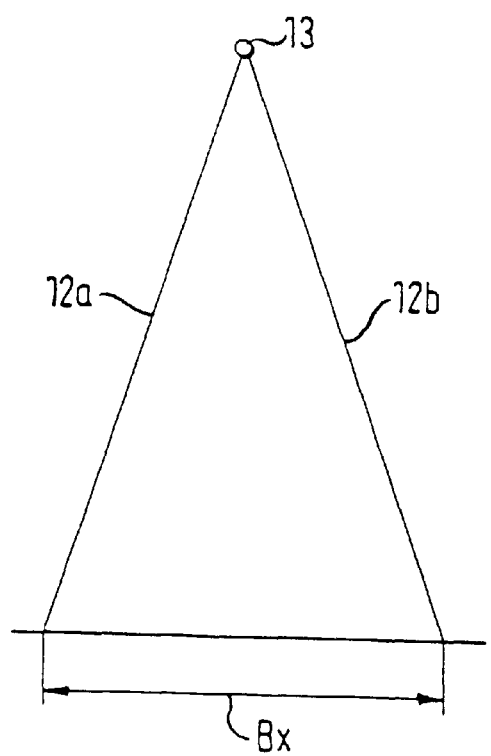

FIG. 1 was explained in the beginning. The invention can be applied to it, for example, by implementing it in a control or automatic control (not shown). The relative positions of the laser head 13 and the workpiece 11 may, in principle, for example be changed by disposing the workpiece 11 on a movable workpiece table 14. The position of the workpiece table 14 may be controllable in the x- and y-directions. Instead or in addition to this, the laser head 13 may also be controlled so as to be shiftable with respect to the column 16 in the x- and y-directions.

When now the relative position between the workpiece 11 and the laser head 13 has to be shifted for the production of a cavity 10 (to produce a workpiece which does not fully fit into the working area Bx, By of the apparatus and/or to avoid shadowing or disadvantageous impinging angles of the laser beam 12 on the workpiece wall), the relative position is in addition set so that in different layers the boundaries of the working area come to be disposed on different sections of the workpiece surface.

Figure 2:
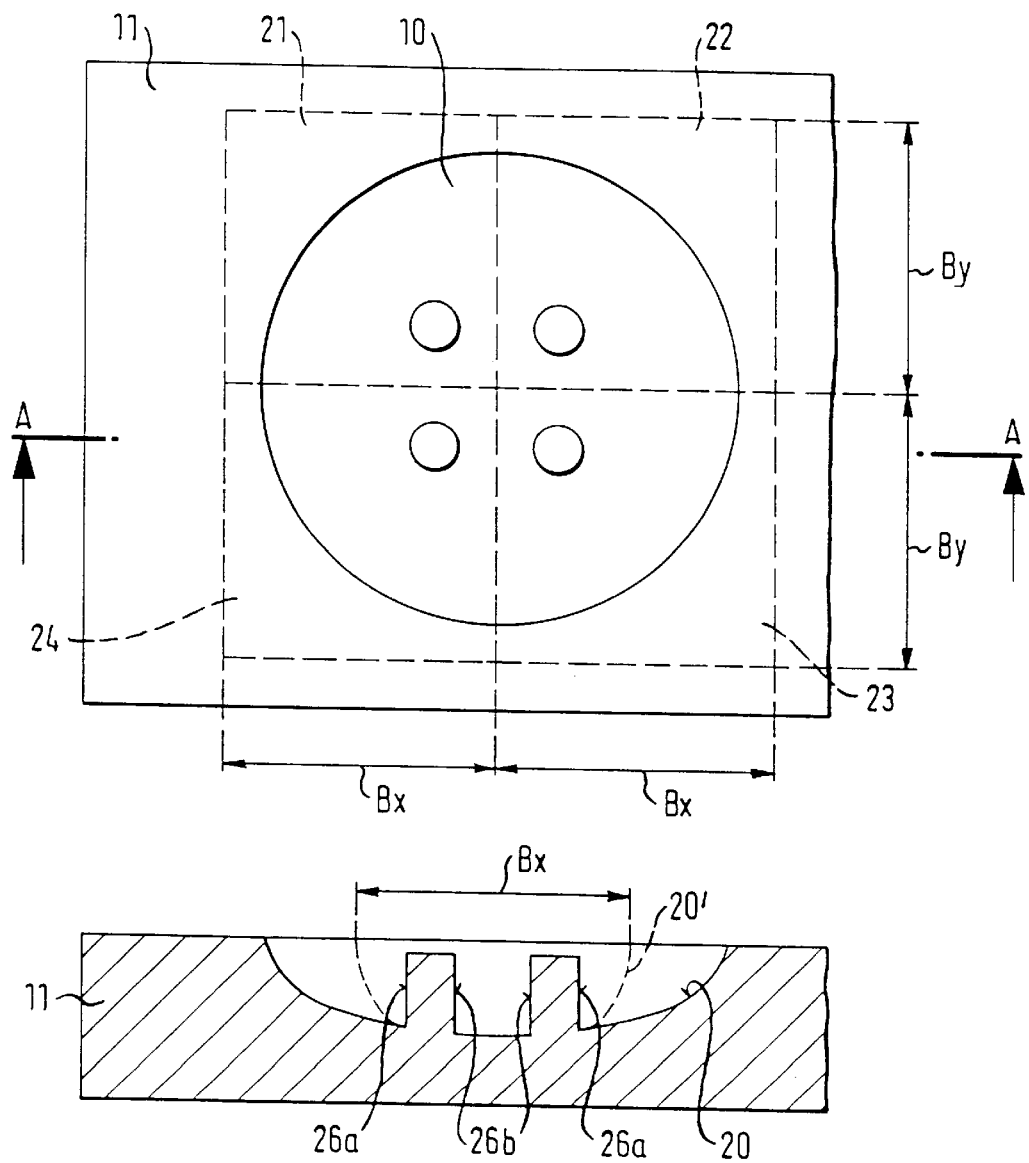
FIG. 2 shows an example for a cavity to be produced.
Figure 3:
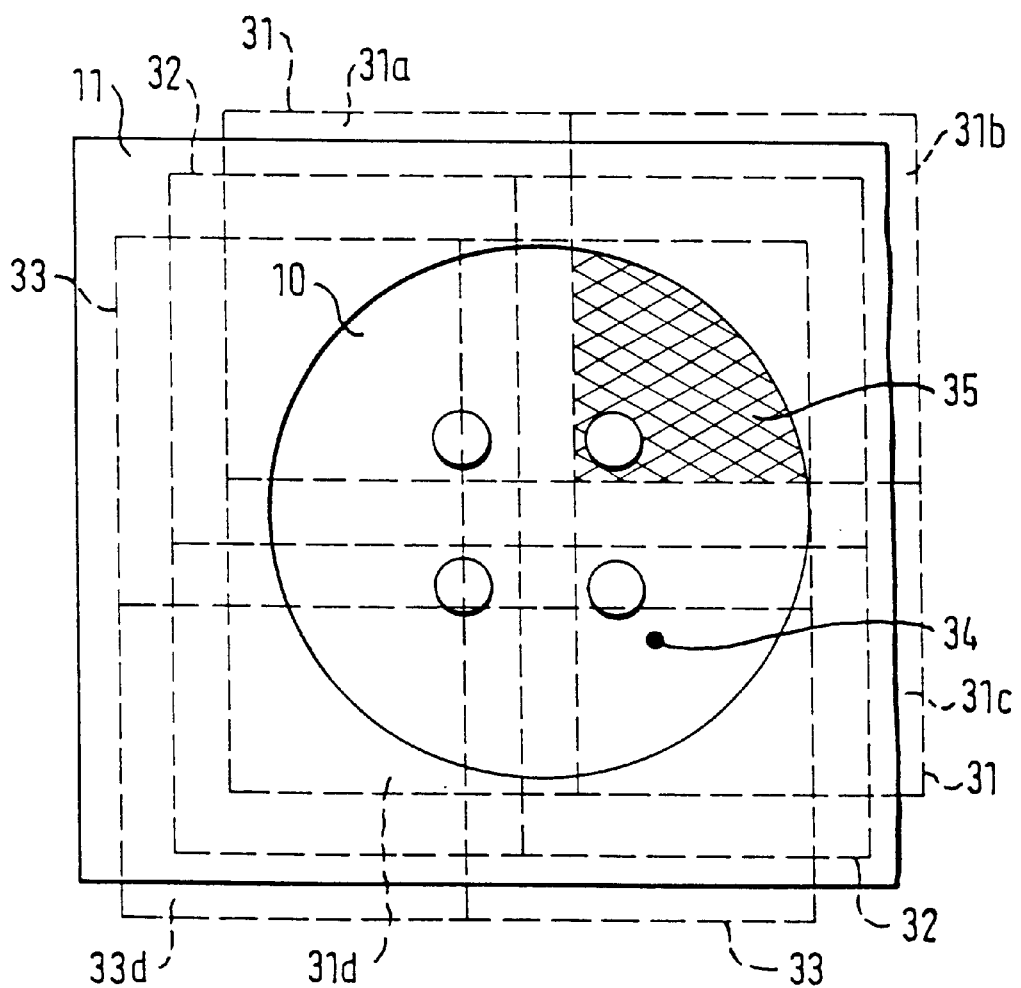
FIG. 3 schematically shows the positioning of the working areas in the different layers according to the invention.

This is schematically shown in FIG. 3. The same cavity 10 as shown in FIG. 2 is assumed. The structures 31, 32 and 33 indicated in broken lines respectively show working area boundaries in different layers of the cavity. Positioning may, for example, be effected as follows:

For removing a first layer the boundaries of the working area are set in accordance with the broken lines 31. This results in four relative positions in accordance with the respective positions 31a, 31b, 31c and 31d of the working area. These are preferably selected so with respect to each other that they are immediately adjacent. The individual relative positions according to 31a–d are successively controlled or set.

When one of the relative positions (e.g. 31b) is set, the removal of substance is carried out within this working area.

The laser beam guidance and/or the laser beam itself are controlled so that within the working area substance is removed only in the section 35 marked by the lozenge pattern. The laser beam may, for example, be guided across the surface in a meandering fashion while the boundaries may be set in accordance with the pattern to be removed by scanning with the laser beam and/or a limitation of the guidance of the laser beam.

After completion of the removal of substance in the working area 31b the next working area 31c is set. In principle the operations described above are repeated there. Thereafter the working area 31d is set which is assumed to be the last working area. Then the removal of one layer is completed.

For the removal of substance in the next lower layer the relative positions may now be selected so that other limits are obtained for the working areas, for example along the broken lines 32. By this boundary positioning the cavity is also fully covered with time. The boundaries, however, are differently positioned in the lower layer than in the upper one. Thus the boundaries of the working area are different in one layer than in the previous layer with respect to the same working position (in the x- and y-directions, e.g. 34 in FIG. 3).

Different strategies for shifting the boundaries 31 to 33 from one layer to the other are feasible. Thus, for example, an alternating approach may be selected in which the boundaries are shifted between the positions 31 and 33 from layer to layer . The boundaries need not be shifted for every layer. For example, several layers may be worked with the boundary positions 31, several with the boundary positions 32, several with the boundary positions 33, etc. The boundary positioning may, under respective consideration of one or both of the above mentioned criteria, be shifted systematically or randomly from one layer to another.

Figure 4:
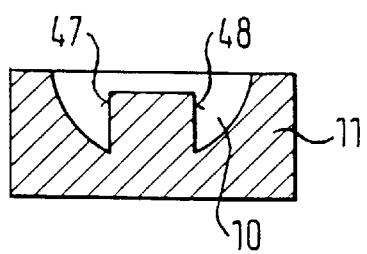
FIG. 4 shows another example of the positioning of the working areas in the different layers according to the invention.

FIG. 4 schematically shows a cavity the dimensions of which are assumed be accessible within a single positioning of the working area of the apparatus. Nevertheless steep walls 44, 48 are to be produced, and the tappet may lead to shadowings on the bottom of the cavity. Therefore displacements of the relative position become necessary in this case also. They correspond to the second criterion mentioned above. For the removal of one layer, for example, the relative positions are set in correspondence with 41a–d, 41a and 41b being adjacent to each other along the boundary 40 and 41c and 41c along the boundary 45. By such a boundary positioning the walls of the tappet can be reached in certain sectors or worked under an advantageous angle, respectively. After setting the relative positions 41a–d machining of one layer is completed.

For machining the next lower layer the boundary positions and particularly the common boundaries may be shifted with respect to the previous layer. Instead of the "seam" 40 between 41a and 41b another position may be selected for the "seam", for example, along the line 45 and later along the line 44. The same applies analogously for the "seams" 42 and 43. In this way the cumulative effect of discontinuous working characteristics in the working area is also prevented.

The numeral 46 denotes a working site having constant x- and y-coordinates. For said same working site 46 in the cavity different working area boundaries 40–45 are set with the progress of the cavity.

Figure 5:
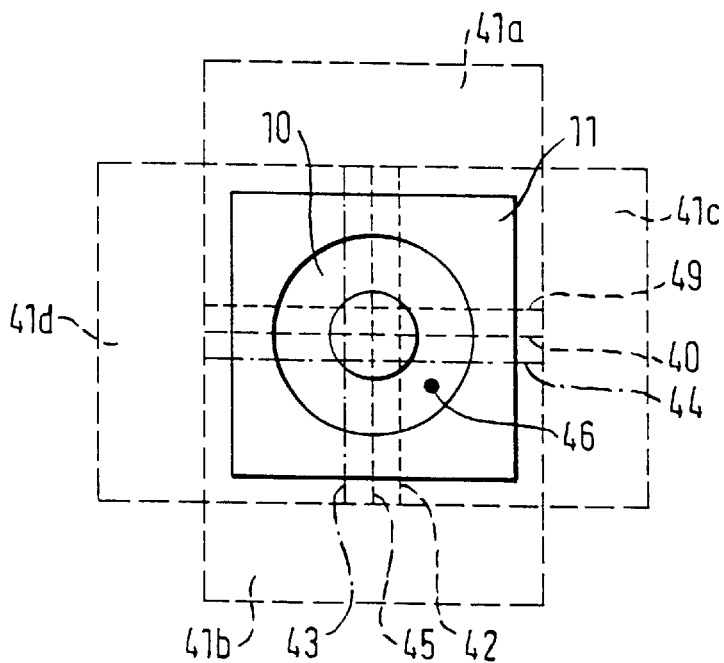
FIG. 5 is a schematic representation for explaining considerations concerning the positioning of the working area.
Figure 5:
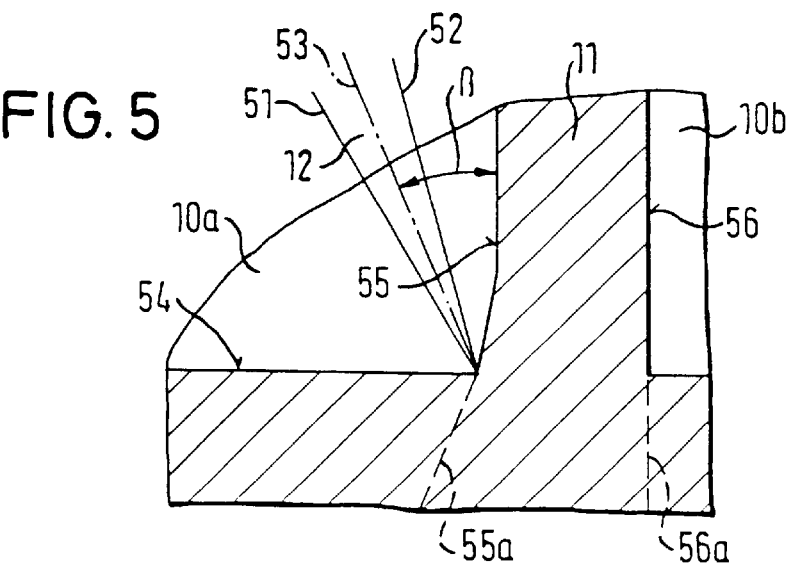

FIG. 5 shows the considerations relating to the angle of impingement of the laser beam. The laser beam is denoted by the numeral 12. It can generally be modelled as a cone-shaped tool since it is a bundle of light focused on the current working position. The cone is indicated by the boundaries 51 and 52. The numeral 53 denotes its central axis. 11 denotes the workpiece, 10a, b the cavity to be produced, 55 and 56 denoting final walls of the cavity while 54 denotes the current bottom. The cavity walls 55, 56 are continued in accordance with the broken lines 55a and 56a and will appear when the cavity is driven down. To enable the walls to be produced as defined as possible, it is desirable to make the angle of impingement of the laser beam not too intersecting along the wall 55. An angle β is shown which is to be the angle between the tangent of the wall on the working site and the central axis 53 of the laser beam. The relative positioning of the workpiece and the working head should be so that the angle β is larger than 10°, preferably larger than 15°. In the example of FIG. 5 the wall 56 is not accessible at all with the current relative positioning. It is shadowed and can only be reached by a laser beam when the relative position is changed.

The removal of a layer within one working area is generally effected alternating with the change the relative position between workpiece and working head. Nevertheless solutions are feasible in which the change of the relative position and the removal of substance in one layer are simultaneously carried out.

It can thus generally be stated that the relative positioning of the tool and the workpiece is, in addition to other criteria, so that identical sites in the working area of the tool are not always disposed on identical working positions on the workpiece when the removal of substance is carried out layer-wise. Thereby cumulative errors may be avoided and a cavity of high quality can be generated.

In the following some typical figures will be indicated as an example. The layer-wise removal of substance is effected with $CO_2$-lasers with a layer thickness of less than 1 mm, preferably less than 100 μm, in the case of YAG-lasers preferably less than 10 μm. The clearance between the head 13 and the workpiece surface 11 is generally less than 200 mm, preferably less than 150 mm. The dimensions of the working area are generally rectangular, the lengths of the sides Bx, By generally being less than 100 mm. The dimensions of the workpiece 11 in the x- and y-direction are principally arbitrary when shifts according to the above-mentioned first criterion are permissible. Cavity depths of a few μm to several mm can be created. In comparably fine working steps nowadays (1998) a YAG-laser is preferable, particularly a neodyme-YAG-laser or a Q-switch-YAG-laser. $CO_2$ lasers are presently suitable for higher layer thicknesses, for example of more than 100 μm.

The laser beam guidance may be effected by pivotable mirrors guiding a laser beam from a fixed laser beam source. Two mirrors may be disposed so that their respective movements cause a movement of the light spot in the x- or y-direction. The common control will than enable scanning of the working area with the light spot.

The mentioned operations are controlled or automatically controlled by an electronic and generally digital controller.

What is claimed is:

1. Apparatus for removing material from the surface of a workpiece (11), material removal being made layer-wise by irradiating a working site (34, 46) at the surface of the workpiece with a laser beam (12) from a working head (13), comprising a laser beam guidance which guides, within a working area (Bx, By, 31a–d, 41a–d), the laser beam across the surface of the workpiece (11), characterised by a positioning means including a controller configured to, after start of the material removal, change and adjust the relative position of workpiece (11) and working head (13) in accordance with a first and/or a second criteria such that, in different layers, a boundary (31–33, 40–45) of the working area (Bx, By, 31a–d, 41a–d) for the same working site (34, 46) is positioned differently on the workpiece surface.

2. Apparatus according to claim 1, characterised in that the first criteria is changing the relative position for covering an area of the workpiece (11) to be worked which is larger than the working area (Bx, By, 31a–d, 41a–d) of the apparatus.

3. Apparatus according to claim 1, characterised in that the second criteria is changing the relative position for working a particular working site at the workpiece (11) in a particular partial area of the working area (41a–d).

4. Apparatus according to claim 1, characterised in that laser beam guidance is accomplished with rotatable mirrors.

5. Apparatus according to claim 1, characterised in that the working area (Bx, By, 31a–d, 41a–d) has rectangular shape.

6. Apparatus according to claim 1, characterised in that the positioning means comprises a workpiece table (14) which is shiftable as compared to a stand (16).

7. Apparatus according to claim 1, characterised in that the positioning means comprises a laser head (13) which is shiftable as compared to a stand (16).

8. Apparatus according to claim 1, characterised in that the laser is a YAG-laser or a $CO_2$-laser.

* * * * *

UNITED STATES PATENT AND TRADEMARK OFFICE
CERTIFICATE OF CORRECTION

PATENT NO.   : 6,670,575 B1
DATED        : December 30, 2003
INVENTOR(S)  : Peter Wrba et al.

It is certified that error appears in the above-identified patent and that said Letters Patent is hereby corrected as shown below:

Column 1,
Line 57, change "This is schematically shown in FIG. 2 is a plan view and" to -- This is schematically shown in FIG. 2. FIG. 2 is a plan view and --

Column 3,
Lines 7-14, change "It is to be explicitly noted here that at a date very close to the date of filing the present application the applicant filed two other applications relating to methods and apparatuses for laser machining of a workpiece, i.e. the application nos. . . . ("Tiefenmessung u.a." (Depth Measurement and Others)) and . . . ("Trennmittel" (Separating means)}. Reference is herewith taken to the full content of said applications."

to -- It is to be explicitly noted here that at a date very close to the date of filing the present application the applicants filed another application relating to a method and apparatus for laser machining of a workpiece, i.e. U.S. Serial No. 09/806,410, filed September 5, 2001, and entitled "Depth Measurement And Depth Control Or Automatic Depth Control For A Hollow to Be Produced By A Laser Processing Device". Reference is herewith taken to the full content of said application.--.

Column 4,
Line 36, change "are assumed be accessible" to -- are assumed to be accessible --.

Signed and Sealed this

Sixth Day of April, 2004

JON W. DUDAS
*Acting Director of the United States Patent and Trademark Office*